(12) United States Patent
Joanisse et al.

(10) Patent No.: US 8,104,727 B2
(45) Date of Patent: Jan. 31, 2012

(54) ADJUSTABLE ARTICLE SUPPORT

(76) Inventors: Denis Joanisse, Canton de Harrington (CA); Paul Rossetto, Woodbridge (CA)

( * ) Notice: Subject to any disclaimer, the term of this patent is extended or adjusted under 35 U.S.C. 154(b) by 386 days.

(21) Appl. No.: 11/716,787

(22) Filed: Mar. 12, 2007

(65) Prior Publication Data

US 2008/0223996 A1    Sep. 18, 2008

(51) Int. Cl.
*E04G 3/00* (2006.01)
(52) U.S. Cl. .................... 248/284.1; 248/276.1
(58) Field of Classification Search .......... 248/161, 248/406.1, 157, 421, 132, 140, 142, 144, 248/145.6, 454, 455, 457, 458, 447, 460, 248/125.1, 125.2, 125.8, 8, 9, 145, 284.1, 248/276.1; 403/72, 73, 83, 84, 85, 99, 103, 403/104, 113; 108/6, 8, 9, 145
See application file for complete search history.

(56) References Cited

U.S. PATENT DOCUMENTS

| | | | |
|---|---|---|---|
| 2,434,986 A | | 1/1948 | Bremmer |
| 3,298,654 A | * | 1/1967 | Dome ........................... 248/567 |
| 3,608,855 A | * | 9/1971 | Osenberg ..................... 248/567 |
| 4,573,657 A | * | 3/1986 | Sakamoto .................... 248/575 |
| 4,682,749 A | | 7/1987 | Strater |
| 4,872,630 A | | 10/1989 | Cooper |
| 4,917,343 A | | 4/1990 | Wainscott |
| 5,211,367 A | | 5/1993 | Musculus |
| 5,564,667 A | | 10/1996 | Copeland et al. |
| 5,641,191 A | | 6/1997 | Jia |
| 5,689,999 A | | 11/1997 | Wiley et al. |
| 5,694,439 A | | 12/1997 | Doyle |
| 5,839,373 A | * | 11/1998 | Lin ............................... 108/140 |
| 6,038,986 A | * | 3/2000 | Ransil et al. ................. 108/145 |
| 6,257,531 B1 | | 7/2001 | Penner |
| 6,726,168 B2 | * | 4/2004 | Barber ....................... 248/284.1 |

* cited by examiner

*Primary Examiner* — A. Joseph Wujciak, III

(57) ABSTRACT

An adjustable support for holding an article such as a notebook computer. The support has a base; an article holding platform; and a single, adjustable, articulated, link connected at one end to the base and at its other end to the platform. The link has two spaced-apart lockable pivots, the pivots dividing the link into a base link member connected to the base, an intermediate link member, and a platform link member connected to the platform. The pivots are of the type having a locking member movable toward the pivot to unlock the pivot. The pivots are normally locked to hold the platform is a desired working position for a user of the notebook. The support has an unlocking mechanism, operable by one hand, for unlocking the pivots simultaneously. While the pivots are unlocked, the platform can be manipulating by the one hand on the unlocking mechanism to adjust the platform to a new working position and then locked in the new position.

24 Claims, 3 Drawing Sheets

ADJUSTABLE ARTICLE SUPPORT

BACKGROUND OF THE INVENTION

1. Technical Field

This invention is directed toward an article support.

2. Background Art

Article supports are used to support an article, such as a notebook computer, in a convenient position to be used by the article user or operator. Often the article support is used by a number of users, each of whom would like the article supported in a position convenient to him or her but which is not convenient to the other users. Article supports that are adjustable are well known. However, the adjustment process for each user is usually involved and time consuming and/or the adjustment means are quite complicated and expensive.

SUMMARY OF THE INVENTION

It is the purpose of the present invention to make an adjustable article support which can be quickly and easily adjusted by the user, using only one hand, to place the article on the support in a desired working position to suit the user. It is another purpose of the present invention to provide an adjustable article support which is simple and relatively inexpensive in construction.

In accordance with the invention an article support is provided having a base, an article supporting platform and a single link joining the platform to the base. The link is of the type having two spaced-apart pivots therein dividing the link into three sections, the pivots making the link articulated. The pivots are of the type that are normally locked but each has an unlocking member which can be moved to unlock the pivots so as to be able to adjust the position of the link and thus the platform. The present invention provides an unlocking mechanism, operable by one hand, to unlock both pivots simultaneously via their unlocking members so as to be able to move the platform with the one hand to a new working position and then lock it in that new position.

The unlocking mechanism has a single handgrip on the platform and a single, rigid, operating member that is movably mounted on the link. The handgrip is designed to be gripped and operated by one hand. The operating member is positioned to be able to simultaneously move the unlocking member on both pivots. An actuator is associated with the handgrip and operably connected to the operating member. A person, while gripping the handgrip with one hand, can actuate the actuator with the one hand to move the operating member to simultaneously move the unlocking members on both pivots to simultaneously unlock the pivots. While continuing to actuate the actuator to keep pivots unlocked, the user can manipulate the platform, via the handgrip and the one hand, to the desired position. Once the desired position is found the user releases the actuator to allow the unlocking members to simultaneously release thereby locking the pivots, and thus the platform, in the desired position.

To make it easier to move the platform, it is connected to the base by a pair of telescopic, gas-filled struts, one on each side of the link. The struts are pivotably connected to both the base and the platform. When the pivots on the link are unlocked, the struts help support the platform above the base. The struts make it much easier for the user to reposition the platform when the pivots are unlocked since the user does not have to support the entire weight of the platform, and the article thereon, with his or her one hand.

The invention is particularly directed toward an adjustable support for holding an article, the support comprising a base, an article holding platform and a single, articulated, adjustable, link connected at one end to the base and at its other end to the approximate center of the platform. The link has two spaced-apart lockable pivots, the pivots dividing the link into a base link member connected to the base, an intermediate link member, and a platform link member connected to the platform. The pivots are of the type that are normally locked and have a locking member movable to unlock the pivot. An unlocking mechanism, having a single hand grip on one of the platform and the platform link member, is provided for unlocking the pivots simultaneously so that while the pivots are unlocked, the platform can be manipulated by one hand on the hand grip to adjust the platform to a new working position and then locked in the new position.

The invention is also directed toward an adjustable support for holding an article, the support comprising: a base; an article holding platform; and a single, articulated, adjustable, link connected at one end to the base and at its other end to the approximate center of the platform. The link has two, spaced-apart, pivots, the pivots dividing the link into a base link member connected to the base, an intermediate link member, and a platform link member connected to the platform. The pivots are of the type having a locking member on the pivot, the locking member normally locking the pivot to prevent movement of the link members connected to the pivot. The locking member is movable relative to the pivot to unlock the pivot to allow the link members to move relative to each other. A pair of telescopic, gas filled, struts extend between the base and the platform, one on each side of the articulated link, the struts pivotably mounted to the base and platform and supporting the platform when the pivots are unlocked. An unlocking mechanism, having a single hand grip on one of the platform and the platform link member, is provided for unlocking the pivots simultaneously so that while the pivots are unlocked, and the platform is supported by the struts, the platform can be manipulated by one hand on the hand grip to adjust the platform to a new working position and then locked in the new position.

DETAILED DESCRIPTION OF THE INVENTION

Figure 1:
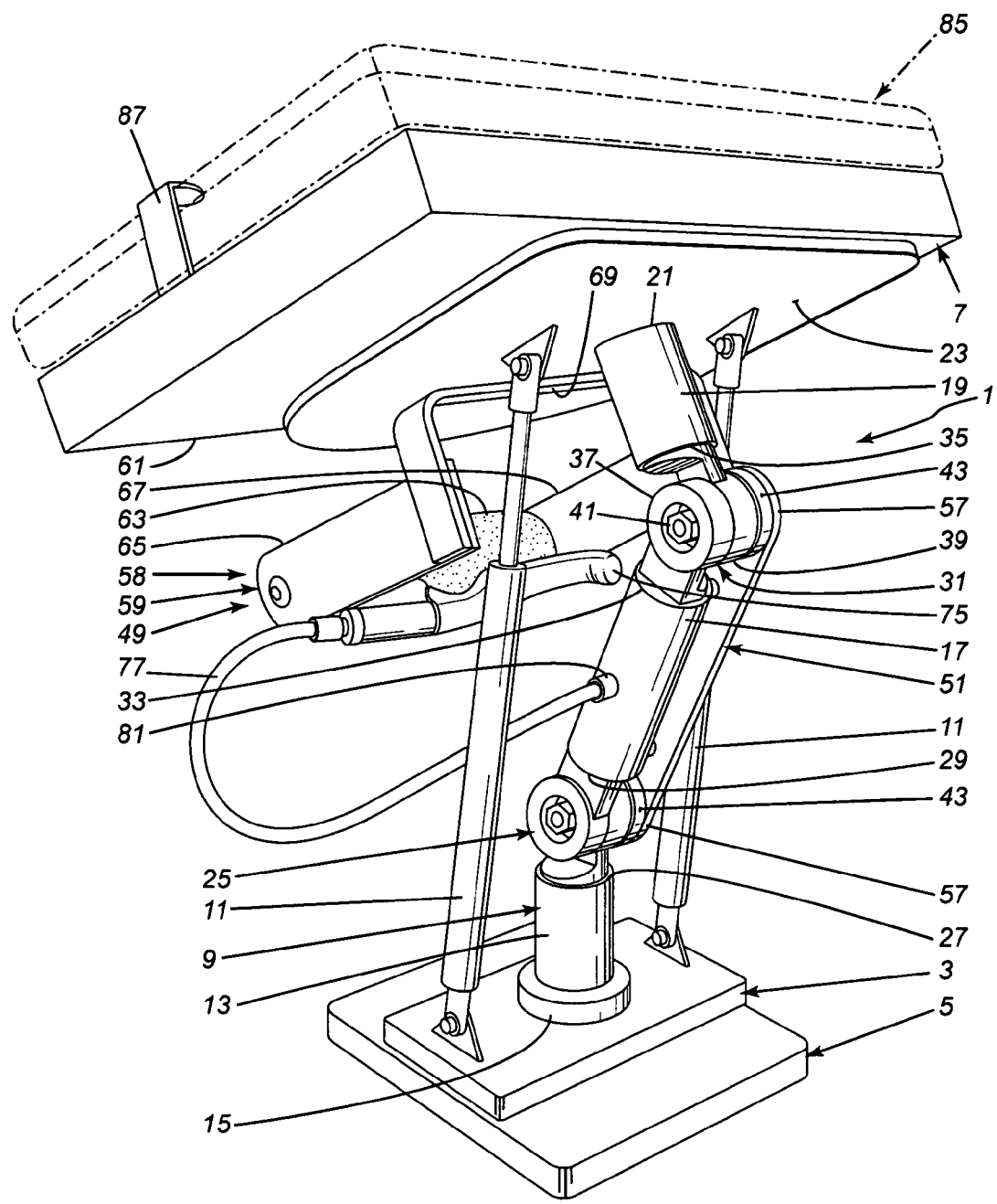
FIG. 1 is a perspective view of the adjustable support.
Figure 2:
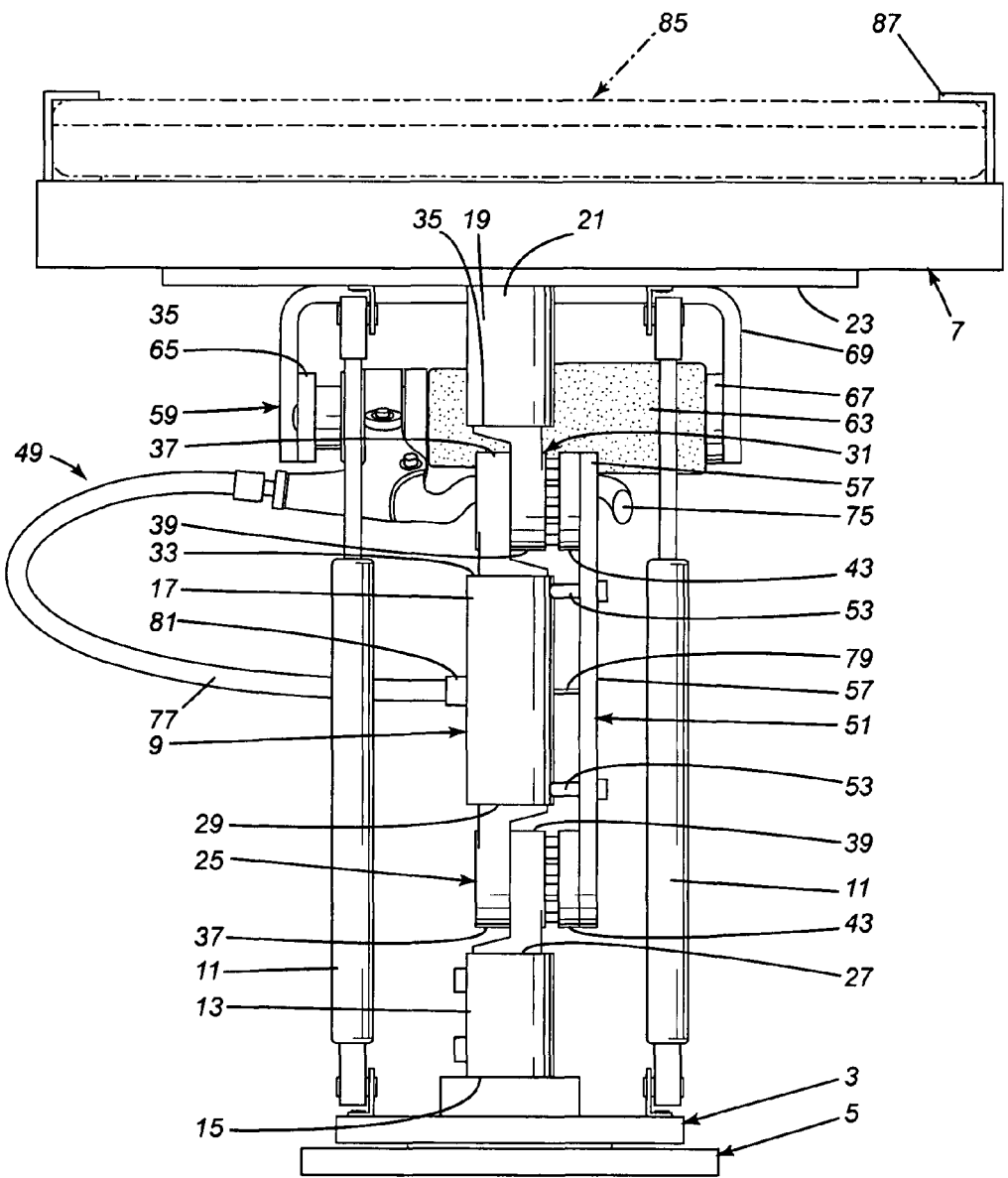
FIG. 2 is a rear elevation view of the support.
Figure 3:
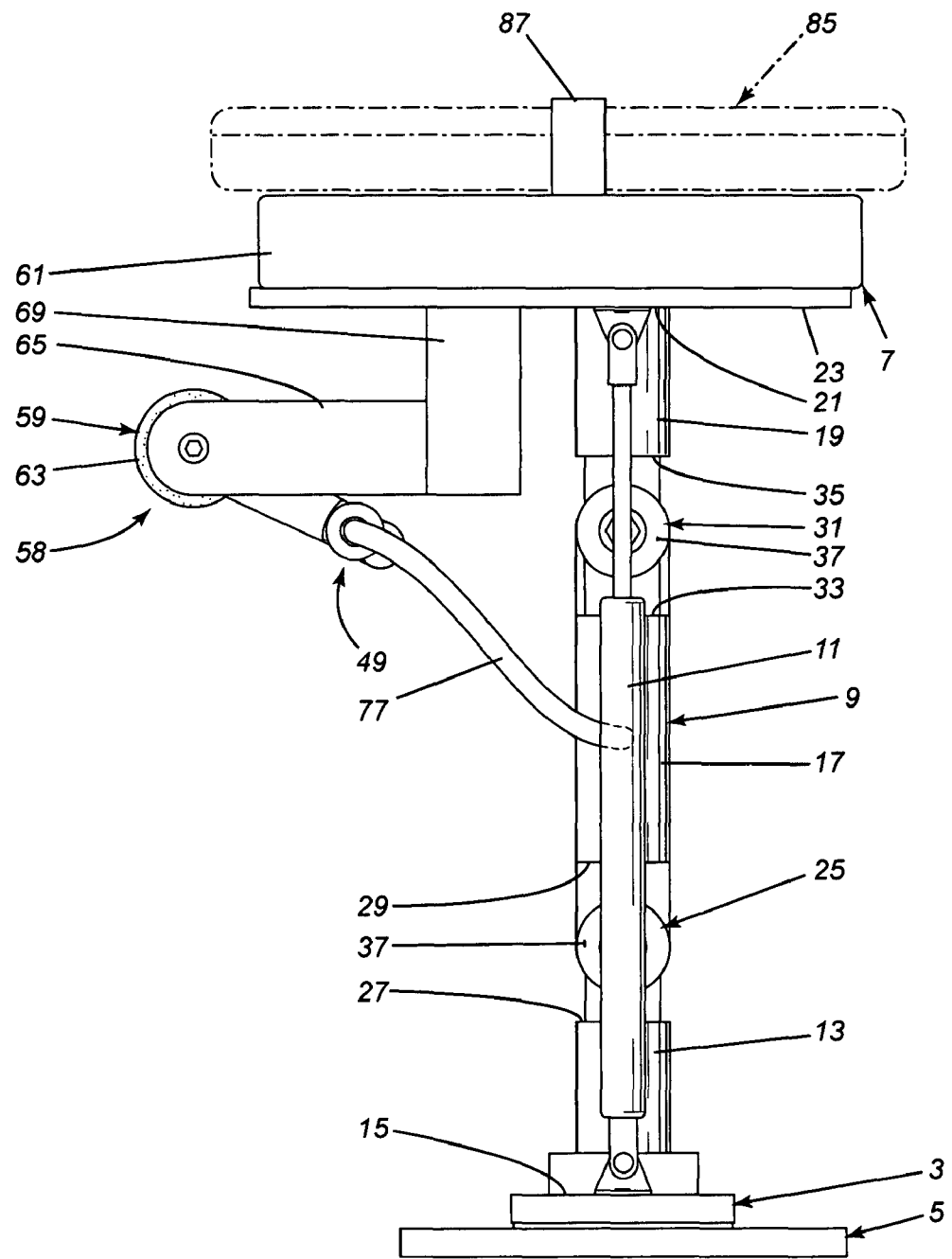
FIG. 3 is a side elevation view of the support.

The adjustable article support 1, as shown in the Figures, has a base 3. The base 3 is rotatably mounted on a sub-base 5. An article support platform 7 is spaced from the base 3. An adjustable, articulated, link 9 extends between the base 3 and the platform 7 holding the platform in a desired position relative to the base 3. A pair of telescopic struts 11, in the form of gas cylinders, one on each side of the link 9, are pivotably connected to the top of the base 3 and the bottom of the platform 7. The struts 11 can be filled with pressurized nitrogen or any other suitable gas. The struts 11 help to stabilize and support the platform 7 on the base 3 when the platform is being adjusted relative to the base. The support 1 can be used without the sub-base 5 in which case the base 3 is mounted directly to a main support such as a wall or a floor. In this case, the platform 7 is not rotatable. Usually however, the support 1 includes the sub-base 5 which is mounted directly to a main support. In this case the platform 7 is rotatable.

The adjustable link 9 comprises a relatively short base link member 13 fixed at one end 15 to the center of the base 3; a relatively long intermediate link member 17; and a relatively short platform link member 19 fixed at one end 21 to the bottom 23 of the platform 7 at about its center. A first lockable pivot 25 connects the upper end 27 of the base link member 13 to the bottom end 29 of the intermediate link member 17 and a second lockable pivot 31 connects the top end 33 of the intermediate link member to the bottom end 35 of the platform link member 19. The axis of rotation of the pivots 25, 31 are parallel to each other and to the base 3.

The lockable pivots 25, 31 are of known type each having a first cylindrical member 37 connected to one of the link members and a second cylindrical member 39 connected to the adjacent link member. The two cylindrical members 37, 39 normally abut circular face to circular face on an axle 41 passing through the members transverse to the circular faces and are locked together with internal locking means so they cannot rotate on the axle 41 relative to one another. A locking member 43 is mounted on and adjacent one 37 of the cylindrical members 37, 39. Manual movement of the locking member 43 toward the cylindrical member 37 in a direction parallel to the axle 41 unlocks the pivot allowing the cylindrical members 37, 39 of each pivot to rotate relative to each other on the axle 41. Releasing the locking member 43 moves it away from the pivot members 37, 39 allowing them to lock together. The pivots 25, 31 are of the type shown in U.S. Pat. No. 5,689,999 the disclosure and drawings of which are incorporated in this application for a fuller understanding of the construction and operation of the pivots. While one type of lockable pivot with a manually operable locking member is described, other types of lockable pivot members with a manually operable locking member could be used.

The support has an unlocking mechanism 49 for unlocking the pivots 25, 31 on the link 9 to allow adjustment of the platform 7. The unlocking mechanism 49 includes a single, rigid, operating member 51 mounted on the intermediate link member 17 in a position to selectively, simultaneously, operate both locking members 43 of the two pivots 25, 31. The operating member 51 can comprise a narrow, flat plate generally aligned with the intermediate link member 17 and parallel to it adjacent one side. The operating member 51 can be slidably mounted on a pair of bolts 53, the bolts 53 threadably mounted on the side of the intermediate link member 17. Other mounting means for movably mounting the operating member 51 on the intermediate link member can be employed. The operating member 51 is moveable toward or away from the intermediate link member 17 while remaining parallel to it. The end portions 57 of the operating member 51 overlie the locking members 43 of the pivots 25, 29 and are normally closely adjacent to them.

The unlocking mechanism includes a handgrip 58 on the platform 7. The handgrip 58 can comprise a handle 59 fixedly connected to the underside 23 of the platform 7 along one side 61. The handle 59 can comprise a gripping bar 63 mounted between two arms 65, 67 at one end of the arms. The other end of the arms 65, 67 are mounted to the underside 23 of the platform 9, via an inverted unshaped bracket 69 and extend past the one side 61 of the platform. The gripping bar 63 can be parallel to the one side 61 and is located just below, and slightly outwardly of, the platform 7. An actuator 75 is pivotably mounted on one end of the gripping bar 63, the actuator extending alongside the bar 63. A Bowden cable 77 extends from the actuator 75 to the center of the intermediate link member 17 on the side opposite operating member 51. The operating cable 79 of the Bowden cable 77 slidably extends through a transverse passageway 81 in the link member 17 and is fastened to the center of the operating member 51.

In use, the adjustable support 1 is fixed in a position by its sub-base 5 where the platform 7 is normally close to a user to hold an article such as a notebook computer 85 in an accessible position to the user. The computer 85 is fastened to the top of the platform 7 by suitable, adjustable fastening means 87 carried by the platform. The user can grab the handgrip 58, or more specifically the gripping bar 63, with one hand, the one hand gripping the actuator 75 against the gripping bar 63 to pull the cable 79 and thus the attached operating member 51 toward the intermediate link member 17. As the operating member 51 is pulled toward the link member 17, it moves the locking members 43 of the pivots 25, 31, via the overlying end portions 57, toward the pivots to unlock both pivots simultaneously. While the pivots 25, 31 are unlocked, the user can move the platform 7, via his one hand on the handle 59 and the actuator 75, to a desired position, raising or lowering it, moving it forward or backward, while also rotating it to the left or right. When the platform 7 has been moved to a desired position suitable for the user, he or she releases the actuator 75 to allow the operating member 51 to move away from the locking members 43, the locking members automatically moving outwardly to lock the pivots 25, 31 in their new position and to thus lock the articulated link 9 and the supported platform 7 in the desired new position. When a different user replaces the original user he or she can easily readjust the platform 7 with one hand to suit his or her own preference for its position.

While the pivots 25, 31 are unlocked, the articulated link 9 can no longer support the platform 7. However, the telescopic struts 11 support the platform while it is being repositioned making it very easy for the user to move the platform to the desired position with one hand.

When pressure is released on the operating member 51 by releasing the actuator 75, internal springs within the pivots 25, 31 move the locking members 43, and thus the operating member 51, away from the pivots to lock the pivots and thus the articulated link 9. Springs (not shown) can also be provided, if necessary, on the mounting bolts 53 mounting the operating member 51 to the link 17, the springs located on the bolts 53 between the operating member 51 and the intermediate link 17. The springs are compressed when the operating member 51 is moved toward the link 17 by the actuating means, the springs moving the operating member 51 away from the link 17 and the locking members 43 when the actuating means are released.

The handgrip 58 has been shown as a handle 59 with a gripping bar 63 parallel to one side 61 of the platform 7. The actuator 75 is mounted on one side of the handle 59 in a position to be gripped by the one hand of the user when grasping the gripping bar 63. The handgrip 58 and actuator 75 could take other forms as well however. The handgrip could be a single lever, like a bicycle or motorcycle handlebar grip, fixedly attached to the side of the platform. In this case the lever would extend transversely to the side of the platform. The actuating lever would be mounted at one end on the single lever in a position to be gripped by the hand of the user when gripping the single lever. Gripping the single lever with one hand allows the user to unlock the locking members on the pivots via the actuating lever and to then manipulate the platform. The handgrip 58 could also be a single lever rotatably mounted on the platform. Rotation of the lever could move an actuator such as a crank arm on the lever to move a cable to move the operating member to unlock the locking members, the lever while rotated, then being used to move the platform. In another embodiment, the platform could have a lateral side extension molded to provide a handgrip. The actuator could be mounted adjacent the molded hand grip in a position to be actuated by the user's hand when the handgrip is grasped. Other handgrip arrangements could be employed. It is only necessary to have a handgrip for a single hand on the platform, or on the platform link member fixed to the platform, with actuating means on the handgrip positioned so that when the handgrip is gripped by the one hand of the user he or she can operate the actuator to unlock the pivots and then manipulate the platform.

The invention claimed is:

1. An adjustable support for holding an article, the support comprising: a base; an article holding platform; a single, articulated, adjustable link connected at one end to the base and at its other end to the platform, the link having two, spaced-apart pivots, the pivots dividing the link into a base link member fixedly connected to the base, an intermediate link member, and a platform link member connected to the platform; the pivots being of the type having a locking member on the pivot, the locking member normally locking the pivot to prevent movement of the link members connected to the pivot, the locking member movable relative to the pivot to unlock the pivot to allow the link members to move relative to each other; a pair of telescopic, gas-filled, struts extending between the base and the platform, and on opposite sides of the articulated link, the struts pivotably mounted to the base and platform and supporting the platform when the pivots are unlocked; and an unlocking mechanism, operable by one hand of a user, for unlocking the pivots simultaneously so that while the pivots are unlocked, and the platform is supported by the struts, the platform can be manipulated by the one hand on the unlocking mechanism to adjust the platform to a new working position and then locked in the new position.

2. An adjustable support as claimed in claim 1 wherein the unlocking mechanism has a single handgrip on one of the platform and the platform Link member to be gripped by the hand of the user and an actuator associated with the handgrip in a position to gripped by the user's hand when gripping the handgrip to unlock the pivots.

3. An adjustable support as claimed in claim 2 wherein the base is rotatably mounted on a sub-base.

4. An adjustable support as claimed in claim 1 wherein the unlocking mechanism has a single, rigid, operating member movably mounted on the intermediate link in a position to be moved to move the unlocking members to unlock the pivots; and an actuator operated by the one hand of the user for moving the operating member.

5. An adjustable support as claimed in claim 4 wherein the base is rotatably mounted on a sub-base.

6. An adjustable support as claimed in claim 1 wherein the base is rotatably mounted on a sub-base.

7. An adjustable support for holding an article, the support comprising: a base; an article holding platform; a single, articulated, adjustable link, the link having a base link member, an intermediate link member and a platform link member, each link member having two ends, the link members connected together in series by first and second pivots, the first pivot connecting together the adjacent ends of the base link and intermediate link members and the second pivot connecting together the adjacent ends of the intermediate link and platform link members; the other end of the base link member connected directly to the base and the other end of the platform link member directly connected to the platform; the said pivots being of the type having a locking member directly on the pivot, each pivot being the sole support for its locking member; the locking member normally locking the pivot to prevent movement of the link members connected to the pivot, the locking member movable relative to the pivot to unlock the pivot to allow the link members to move relative to each other; and an unlocking mechanism having a single handgrip on one of the platform and the platform link member, the unlocking mechanism unlocking the said pivots simultaneously so that while the pivots are unlocked, the platform can be manipulated by one hand on the handgrip to adjust the platform to a new working position, and then locked in the new position; the unlocking mechanism having a single, rigid, operating member movably carried by the link and positioned to be able to selectively, directly move the locking members on the pivots; an actuator associated with the handgrip in a position to be actuated directly and simultaneously by the user with the hand used to grip the handgrip; the actuator operably connected to the operating member; the actuator, when actuated, moving the operating member to move the locking members on both pivots simultaneously to unlock the pivots.

8. An adjustable support as claimed in claim 7 wherein the locking members are movable toward the pivots to unlock the pivots and movable away from the pivots to lock them.

9. An adjustable support as claimed in claim 8 wherein the operating member is a plate member connected to the intermediate link member by guide means, the guide means guiding the plate member for movement toward and away from the intermediate link member, the plate member being parallel to the intermediate link member and having end portions adjacent and overlying the locking members on the pivots, the end portions moving the locking members toward the pivots to unlock the pivots when the actuator moves the plate member toward the intermediate link.

10. An adjustable support as claimed in claim 9 wherein the actuator is operably connected to the operating member by a cable, the cable passing transversely through the intermediate link and connected to the approximate center of the operating member.

11. An adjustable support as claimed in claim 8 wherein the handgrip is a handle having a gripping bar mounted between two arms, the arms connected to one of the platform and the platform link member to locate the gripping bar under the platform and near a side of the platform.

12. An adjustable support as claimed in claim 11 wherein the actuator is a lever adjacent to the gripping bar, the lever pivoted at one end to the handle.

13. An adjustable support as claimed in claim 9 wherein the handgrip is a handle having a gripping bar mounted between two arms, the arms connected to one of the platform and the platform link member to locate the gripping bar under the platform and near a side of the platform.

14. An adjustable support as claimed in claim 13 wherein the actuator is a lever adjacent to the gripping bar, the lever pivoted at one end to the handle.

15. An adjustable support as claimed in claim 10 wherein, the handgrip is a handle having a gripping bar mounted between two arms, the arms connected to one of the platform and the platform link member to locate the gripping bar under the platform and near a side of the platform.

16. An adjustable support as claimed in claim 15 wherein the actuator is a lever adjacent to the gripping bar, the lever pivoted at one end to the handle.

17. An adjustable support as claimed in claim 9 wherein the base is rotatably mounted on a sub-base.

18. An adjustable support as claimed in claim 10 wherein the base is rotatably mounted on a sub-base.

19. An adjustable support as claimed in claim 9 including a pair of telescopic, gas filled, struts extending between the base and the platform, one on each side of the articulated link, the struts pivotably mounted to the base and platform and supporting the platform when the pivots are unlocked.

20. An adjustable support as claimed in claim 8 wherein the base is rotatably mounted on a sub-base.

21. An adjustable support as claimed in claim 8 including a pair of telescopic, gas filled, struts extending between the base and the platform, one on each side of the articulated link, the struts pivotably mounted to the base and platform and supporting the platform when the pivots are unlocked.

22. An adjustable support as claimed in claim 7 wherein the handgrip is a handle having a gripping bar mounted between two arms, the arms connected to one of the platform and the platform link member to locate the gripping bar under the platform and near a side of the platform.

23. An adjustable support as claimed in claim 7 wherein the base is rotatably mounted on a sub-base.

24. An adjustable support as claimed in claim 7 including a pair of telescopic, gas filled, struts extending between the base and the platform, one on each side of the articulated link, the struts pivotably mounted to the base and platform and supporting the platform when the pivots are unlocked.

* * * * *